Sept. 24, 1957 W. F. CRONIN 2,807,756
INDUCTIVE DISTRIBUTOR
Filed July 17, 1953
FIG.1
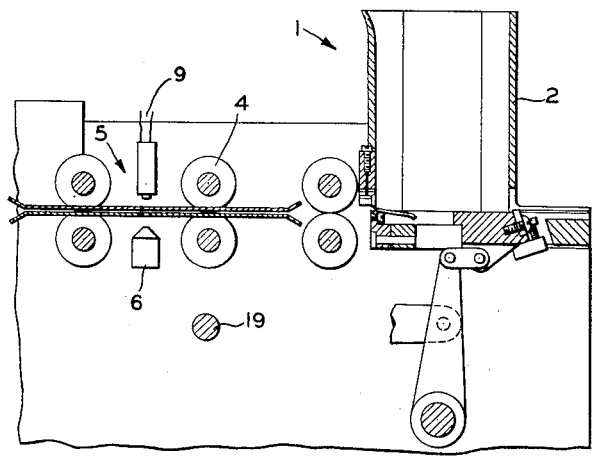
FIG.2
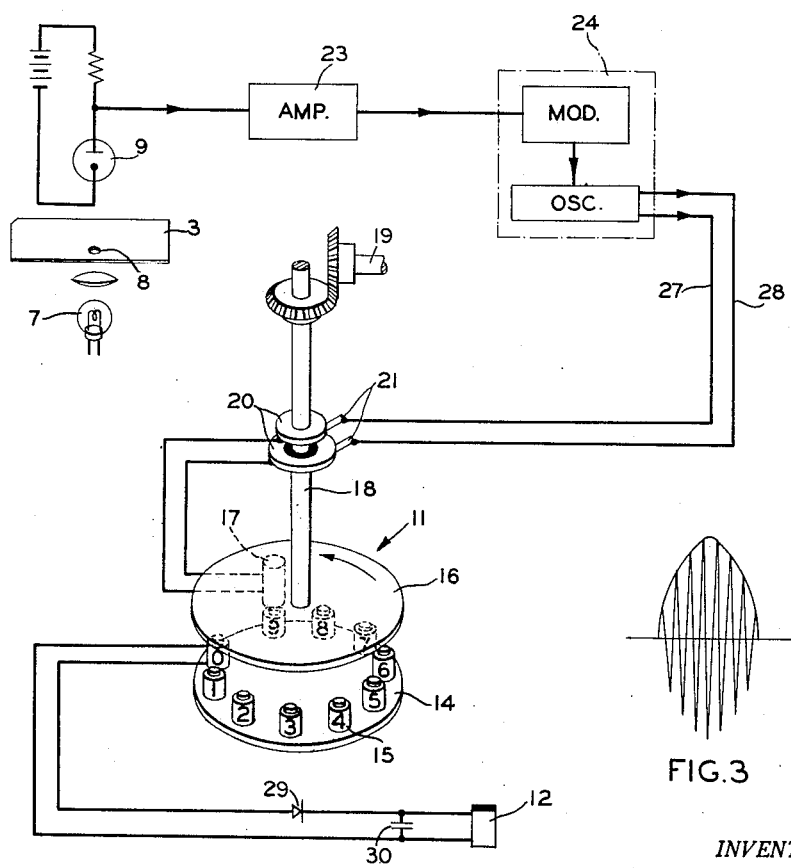
FIG.3
INVENTOR.
WILLIAM F. CRONIN
BY George V. Eltgroth
J. L. Sterling
ATTORNEYS

United States Patent Office 2,807,756
Patented Sept. 24, 1957

2,807,756

INDUCTIVE DISTRIBUTOR

William F. Cronin, Rye, N. Y., assignor to Sperry Rand Corporation, a corporation of Delaware Application July 17, 1953, Serial No. 368,712

1 Claim. (Cl. 317—123)

This invention pertains in general to devices employing light responsive means, such as a photo-electric cell, for sensing perforated record cards. It is particularly concerned with means for transmitting pulses emitted by sensing devices of this nature in a manner suitable for the efficient operation of load circuits, such as may include electro-magnetic devices useful in the operation of, or conditioning for operation of various mechanical devices, such as the pocket gates of a sorter, the elements of a card punch, or the elements of a printing or counting device.

In general the invention proposes in devices feeding perforated record cards to a light responsive sensing means, such as a photo-electric cell, circuits for amplifying the pulses emitted from the cell, converting them to a modulated form and transmitting them through an inductive distributor to selectively operate the electro-magnetic devices of a load circuit.

A feature of the invention is the complete absence of mechanical make and break contacts in the pulse transmission circuit.

An advantage of the invention is the transmission to the load circuit of pulses having a constant peak power.

Another advantage of the invention is the capacity of the device in which it is employed to operate over a wide range of feed speeds without necessitating circuit modifications.

The invention has for one of its objects a pulse transmission circuit to a load circuit without make or break contacts in a device wherein perforated record cards are fed to a light responsive sensing station.

A further object of the invention is an arrangement, in a device employing photo-electric cell sensing of perforated record cards, of a highly efficient pulse transmission circuit for the operation of a load circuit.

Another object of the invention is a modulated pulse transmission circuit in association with an inductive distributor in a machine using perforated record cards and employing a photo-electric cell sensing arrangement.

The invention is disclosed, by way of illustration only, in a sorter of perforated cards employing photo-electric cell sensing means, it being understood that it may be utilized in other and a wide variety of devices.

The foregoing objects and advantages of this invention, as well as others, will become readily apparent as this specification unfolds in further detail, and as it is read in conjunction with the accompanying drawing forming a part of this application.

In the drawing:

Fig. 1 is a schematic arrangement of a sorter embodying the invention;

Fig. 2 is a diagram of the circuit arrangement; and

Fig. 3 represents the modulated wave pattern.

In further describing the invention reference is directed to the drawing, wherein there is disclosed conventional card feed means 1 including a card magazine 2 from which perforated record cards 3 are fed and carried by suitably driven rollers 4 through a conventional photo-electric cell light sensing station, generally designated 5. The cards are fed, it will be assumed, for successively sensing the index positions 0–9 of a single column of a record card while the cards are moving through the sensing station. The sensing station 5 includes a suitable closure 6 which contains a source of light 7 adapted to pass a beam through a perforated index position 8 of a record card to suitable light responsive means, here a photo-electric cell 9, causing the latter to emit in conventional manner an electrical pulse.

Pulses emitted from cell 9 are transmitted through mesne circuits to an inductive distributor 11 for distribution to a plurality of solenoids 12, of which it suffices to show but one, of a load circuit. The solenoids serve to set the time of opening of conventional card receiving pockets, not shown, as disclosed in U. S. Patent 1,476,161 to W. W. Lasker.

The inductive distributor includes a stationary support member 14 on the upper surface of which there are mounted in ring formation and in fixed spaced relation to one another a plurality of electro-magnetic devices, or core windings 15. There is a core winding 15 individual to each of the index positions of a card, so that the pulse sensed through the perforation of any particular index position will be transmitted to its corresponding core winding 15. There may be a solenoid 12 individual to the gate of each card pocket and there may be one or more of these solenoids individual to each core winding 15.

The distributor also includes a rotary disc element 16 to the undersurface of which near the underside of the edge thereof is fixed a single electro-magnetic device or core winding 17. Disc 16 is secured fast to a rotatable shaft 18. Shaft 18 carries a pair of slip rings 20. Brushes 21, connected to the output of an amplitude modulation circuit 24 to be further mentioned later on herein, serve to transmit to the slip rings pulses originating from the cell 9. The slip rings serve to commute the pulses to the single core winding 17. Shaft 18 is geared in suitable manner for synchronized rotation with the card feed shaft 19. The rotary disc element 16 is adapted to be carried about with the rotation of the shaft 18, and the core winding 17 thereon is adapted to successively pass over each of the core windings 15 of the distributor elements immediately below and in such manner that as the index positions of a card column are successively sensed the core winding 17 successively passes over correspondingly related core windings 15. Pulses emitted on the sensing of any perforated index position will be induced by the electro-magnetic element 17 in the corresponding electro-magnetic element 15. The air gap separating the opposite faces of the elements 17 and 15 is preferably about 0.020 inch.

It is plain that pulses emitted by the cell 9 might fluctuate in strength depending upon the speed of card feed and the rotational speed of the rotary element 16 of the inductive distributor. This is apt to cause missing or non-operation of some of the load circuit solenoids 12, particularly in the event the sorter is run at low speeds. To avoid this difficulty, means is provided to control the pulses transmitted by the distributor so that the peak power of the pulses transferred to the load circuit will remain constant, thereby enabling a sorting operation over a wide range of speeds without necessitating circuit modifications. To this end there is included in the transmission circuit from cell 9 to the inductive distributor a pulse amplifying stage 23 and an amplitude modulation circuit 24.

The amplifier stage may comprise any suitable amplifying means, such as a triode vacuum tube, suitable to amplify the weak pulses emitted from the photo cell 9. Any suitable amplitude modulation circuit 24 may be provided and it may include a suitable oscillator stage. The latter is preferably operable at a frequency of 10 kilocycles per second and coupled with the amplifier in suitable manner in a modulating circuit 24 to produce pulses in the output circuit having an amplitude modulated wave pattern, as indicated in Fig. 3. The amplifier, modulator and oscillator stage are shown coupled together in symbolical block form, as it is clear that any suitable amplifier, modulation network and oscillator coupled together may be used.

The amplitude modulated pulses are transmitted over the circuit lines 27, 28, and brushes 21 to the slip rings 20, and subsequently through the inductive winding 17 to the windings 15, as previously described.

The solenoids 12 of the load circuit are preferably operable by a suitable direct current. Suitable means to this end is included in the circuit from each core winding 15 to its related solenoid. This means may be a suitable rectifier 29 and capacitor 30 by which a pulse induced in the core winding 15 is transmitted in suitable form to the related solenoid.

While I have described what I consider to be a preferred form of the invention, it is my intent, however to claim the invention not only in the form disclosed, but also in all such forms as may reasonably be construed to be within the spirit of the invention and scope of the appended claim.

What I claim as new, and desire to secure by Letters Patent is:

In a card feeding device employing photo-electric cell means for sensing the perforations of a card, an amplifier stage for amplifying pulses emitted from the photoelectric cell, an oscillator and modulation stage for converting the pattern of the emitted pulses from a pulsating D. C. form to a modulated form of a desired frequency, an inductive distributor for distributing the modulated pulses to a load circuit, and rectifier and capacitor means serving to rectify and filter the distributed pulses prior to their reception by the load circuit.

References Cited in the file of this patent

UNITED STATES PATENTS

| | | |
|---|---|---|
| 1,352,940 | Brown | Sept. 14, 1920 |
| 1,661,651 | Bossart | Mar. 6, 1928 |
| 2,030,277 | Taylor | Feb. 11, 1936 |
| 2,098,002 | Guerin et al. | Nov. 2, 1937 |
| 2,330,526 | Sorensen | Sept. 28, 1943 |
| 2,331,003 | Smith | Oct. 5, 1943 |
| 2,518,694 | Jannopouls | Aug. 15, 1950 |

FOREIGN PATENTS

| | | |
|---|---|---|
| 716,644 | Germany | Jan. 26, 1942 |